Patented Jan. 5, 1937

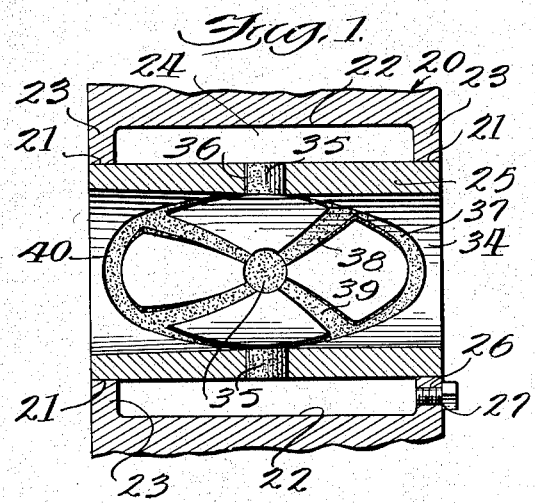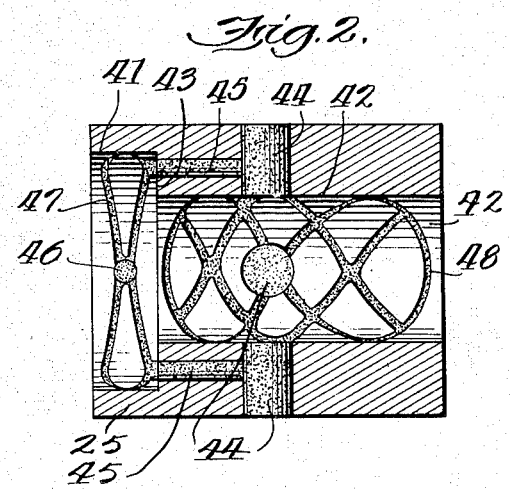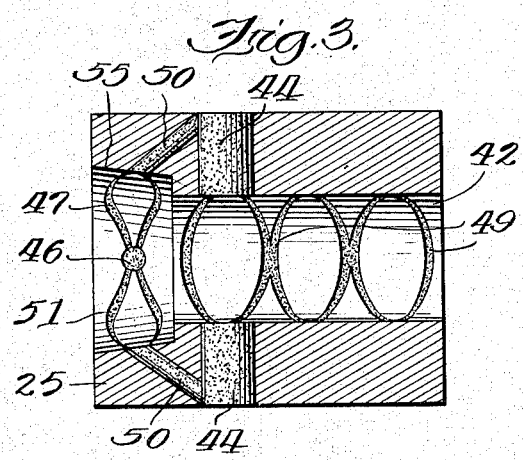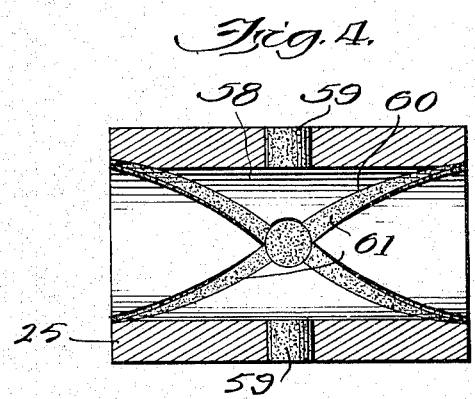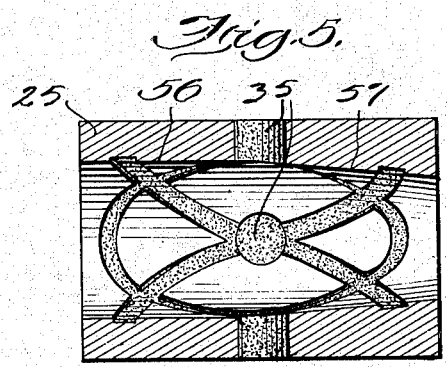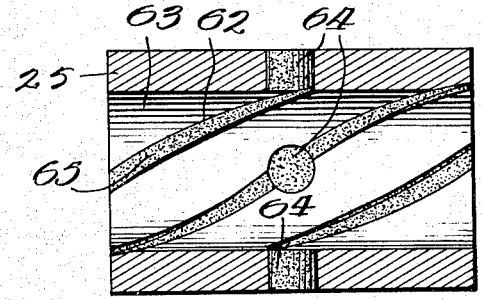

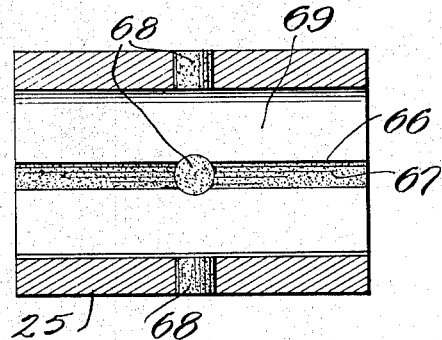
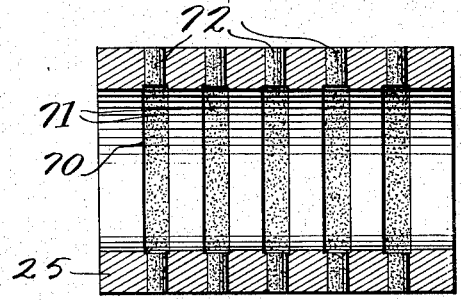
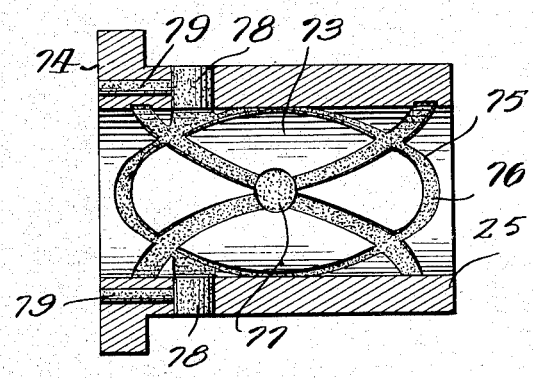
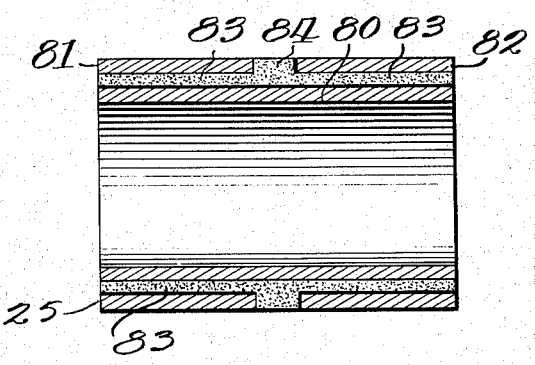
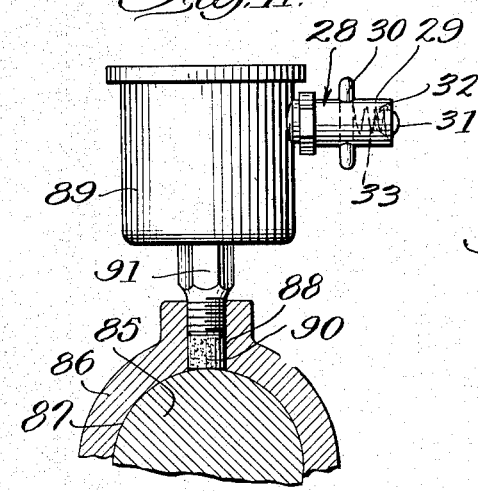
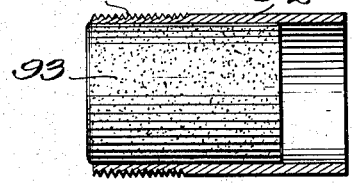
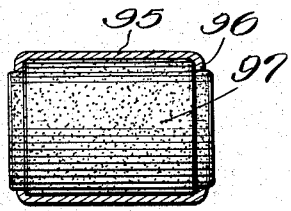

2,067,034

UNITED STATES PATENT OFFICE 2,067,034

HEAT RESPONSIVE SELF-LUBRICATING BEARING

Robert H. Whiteley, Oak Park, Ill., assignor to Robert H. Whiteley, trustee

Application August 26, 1931, Serial No. 559,397

2 Claims. (Cl. 308—36.3)

The present invention relates to heat responsive, self-lubricating bearings, and is particularly concerned with bearings of the type having a reservoir and lubricant dispensing means of the same general type described and claimed in my prior Patent No. 1,936,894 issued November 28, 1933, and in my Patent No. 1,695,750, issued December 18, 1928, of which first said patent is a continuation in part.

One of the objects of the present invention is the provision of an improved heat responsive self-lubricating bearing which is capable of supplying lubricant at an accurately predetermined temperature, but in which the lubricant does not flow until the predetermined temperature is reached.

One of the principal effects of a lack of lubrication in bearings of any kind, is the generation of heat due to the increased friction between the bearing surfaces and the presence of heat is therefore an indication of the need for further lubrication. Indeed, if the friction is continued for a sufficient period of time without lubrication, the bearing may become so hot that the bearing may be permanently damaged, or if the parts have a close fit, they may expand sufficiently to prevent further motion.

The dire results of the lack of lubrication are so well known that they need not all be enumerated here, except to show that it is highly desirable to automatically check the effects of destructive friction before they become apparent by squeaking, sticking or heating, such as may be apparent to the operator by feeling, smoking or other indications.

In my prior application, a heat responsive self-lubricating bearing was disclosed which was capable of increasing the flow of lubricant responsive to a condition of heat in the bearing or reservoir, and one of the objects of the present invention is to provide an improved bearing in which the flow of lubricant may be prevented until a predetermined operating temperature is reached, after which the dispensing of lubricant should begin, and the flow should depend in a measure upon the amount of heat generated and the temperature of the surrounding parts.

Another object is the provision of an improved form of bearing for water pumps or the like, which is adapted to provide a substantially water-tight seal about the shaft of a water pump or the like, without the necessity for packings, thereby decreasing the cost of the finished pump and decreasing the friction which would be caused by the use of packings.

Another object is the provision of a plurality of forms or modifications of my improved bearings, each of which has peculiar advantages due to its structure, and each of which is capable of dispensing lubricant advantageously under particular conditions.

Other objects and advantages of the invention will be apparent from the following description and from the accompanying drawings, in which similar characters of reference indicate similar parts throughout the several views.

Referring to the drawings, of which there are two sheets;

Fig. 1 is a transverse sectional view taken on the plane of the axis of the bearing, showing the complete installation;

Fig. 2 is a similar view of another form of bearing shell having a thrust bearing for providing an oil seal on the shaft utilized in this bearing;

Fig. 3 is a bearing shell of another type provided with an ordinary cylindrical bearing, an annular thrust bearing and a tapering bearing capable of providing an oil seal on a pump shaft;

Fig. 4 is another modification showing a different form of construction;

Fig. 5 is another modification employing the closed loop type of groove and having a cylindrical bearing surface and a frusto-conical or tapered bearing surface;

Fig. 6 is another modification with spirally extending lubricant dispensing members;

Fig. 7 is another modified form of bearing sleeve having longitudinally extending lubricant distributing members;

Fig. 8 shows another modified form of bearing sleeve having circumferentially extending lubricant dispensing members;

Fig. 9 is another modified form of self-lubricating, cylindrical, and thrust bearing;

Fig. 10 is another modified form of double thrust bearing;

Fig. 11 is another modification in which the external form of reservoir is employed;

Fig. 12 is a transverse, sectional view taken longitudinally of the axis of a unitary lubricant dispensing member which may be used with various types of bearings and reservoirs;

Fig. 13 is another view similar to Fig. 12, of another form of lubricant dispensing member.

Referring to Fig. 1, this is an illustration of one of the forms of reservoir which may be utilized in the bearings of the present invention. The frame 20 of the machine including the bearing, is provided with a pair of bores 21 registering with each other and communicating with an enlarged counterbore 22. In other words, the frame 20 is provided with an aperture passing through the frame having the inwardly extending annular flanges 23 at each end of the aperture and having an annular chamber 24 formed between the flanges 23. When a bearing sleeve 25, as shown in Fig. 1, or any of the other bearing sleeves shown in this or my other applications are fitted in the bores 21, the annular lubricant chamber 24 is completed, the bearing sleeve 25 forming the inner wall of the reservoir 24.

The bearing sleeve 25 preferably has a close frictional fit with the annular flanges 23, being pressed into place, but in some embodiments, threaded sleeves may be employed or other modes of securement utilized, provided the reservoir 24 is made substantially oil tight.

The reservoir 24 may be provided with a filling aperture 26 closed with a threaded filling plug 27 or provided with a standard high pressure lubricating fitting 28 (Fig. 11). The lubricating fitting 28 may consist of a tubular chamber 29 having a transverse pin 30 and a ball valve 31 disposed in the inlet aperture 32. A spring 33 urges the ball valve 31 into engagement with the edges of aperture 32 to maintain the valve in closed position.

In the embodiment of Fig. 1, the bearing sleeve 25 is provided with a substantially cylindrical bearing surface 34. The bearings constructed according to the present invention, are preferably provided with one or more lubricant dispensing members 35 extending from the reservoir 24 to the bearing surface 34. These lubricant dispensing members preferably consist of an initially plastic compound of graphite which may be purchased on the open market, and which consists principally of a binder and graphite having the property of conducting lubricant and dispensing it in measured amounts over a bearing surface, over a long period of time.

This graphite compound may be intruded into the conduit 36 under pressure, and set in place by baking the compound in the bearing, and the process of baking renders the graphite dispensing members 35 porous and capable of conducting lubricant from the reservoir 24 to the bearing surface 34.

The lubricant dispensing members 35 may assume many of the forms described in my prior applications, having clinchers, if desired or heads, or the graphite may be secured in place by intimate contact under pressure of the compound with the walls of the conduit 36. If desired, the graphite may initially protrude from the bearing surface 34, providing an excess of the compound which is distributed over the surface of the bearing, glazing the surface and rendering it capable of more easy lubrication.

The bearing surfaces of the present bearing sleeves are also preferably provided with a multiplicity of different forms of grooves 37, 38, 39, 40, for dispensing the lubricant that is conducted to the bearing surface 34, and distributing the lubricant uniformly over the surface.

In the embodiment of Fig. 1, the lubricant distributing grooves 37 are also filled with initially plastic, baked, porous graphite compound, and the lubricant dispensing members 35 are preferably located at the intersections of the various grooves. The grooves 37—40 each extend longitudinally and diagonally across the bearing surface from one end to the other, comprising substantially elliptical loops. The ends of the loops are so located that the respective loops 37—40 cross each other, and the graphite in the grooves 37—40 is thus distributed diagonally over the major portion of the bearing surface 34 to carry lubricant to every part of the surface.

The present bearings are preferably filled with solidified lubricant which is adapted to melt at a predetermined temperature, but which is solid at ordinary room temperatures, so that lubricant does not flow until the bearing has become heated to the predetermined temperature. The walls of reservoir 24 are in heat conducting relation with the bearing sleeve 25, and bearing surface 34, so that the heat generated in the bearing surface is transmitted to the solidified lubricant in the reservoir 24. The temperature at which the lubricant melts may be accurately predetermined by mixing relatively solid lubricating material with liquid or viscous lubricating material, and I do not wish to be limited to any particular temperature or range of temperatures. The lubricant composition which is given herein is merely exemplary of one of the predetermined temperatures for one particular purpose, and practically any desired temperature may be attained within the range of a melting temperature of solidified lubricating material.

For instance, water pumps of a particular type may run at a temperature of about 160 to 180° F. at the bearings. One form of lubricant for melting at a predetermined temperature may consist of a mixture of 50% of petrolatum by volume, with 50% of ordinary cylinder oil, such as Polarine, which has a viscosity of 175 at 180° F. Ordinary petrolatum is solid below 132° F., and it begins to melt at about 128° F. Such a mixture of lubricants is substantially solid at temperatures below the melting temperature of the mixture, but the mixture may liquefy at a temperature of about 128° F., and as soon as the pump bearing has reached this predetermined temperature, the flow of lubricant begins.

The bearing being heat responsive, as described in my prior application, the expansion of the gases and/or lubricant in the reservoir 24 with the further thinning action of heat on the lubricant, causes an increased flow of lubricant with an increase in temperature, and while the present bearing is capable of operating for years without replenishment of the lubricant, the bearing surface is always constantly supplied with just enough lubricant to maintain the desired oil film, and the action of the graphite also aids in assuring adequate lubrication.

The present bearing may be exemplified in a number of different forms, and I have discovered that by virtue of the substantially constant oil flow and constant maintenance of an oil film, certain bearings of particular construction are capable of use for replacing the bearing and packing of water pumps. For instance, the bearing of Fig. 2 is provided with the cylindrical bearing surface 41 of enlarged size, and the counterbore bearing surface 42 between which there is an annular thrust bearing 43.

The lubricant dispensing members consist of relatively large porous graphite compound plugs 44, which would be in communication with the reservoir 24 and bearing surface 42. Leading from the large graphite plugs 44 are a plurality of relatively smaller graphite plugs 45 which conduct lubricant to the thrust bearing surface 43, and other graphite plugs 46 may conduct lubricant to the graphite filled grooves 47. The bearing surface 42 may be provided with a multiplicity of grooves 48 comprising the diagonally extending loops described in Fig. 1, the loops being double, taking the form of a figure eight, and being so disposed that a multiplicity of loops or grooves cross every groove.

Referring to Fig. 3, this is an improved form of bearing in which the bearing is provided with a counterbore 55. In this embodiment the triple crossing bearing loops 49 have been employed on the bearing surface 42, and diagonally extending graphite plugs 50 communicate with the enlarged plugs 44 to supply lubricant to the tapered bearing surface 51. The tapered bearing surface 51 engages a complementary frusto-conical surface on the shaft, and by means of the constant flow of lubricant and the constant maintenance of an oil film on this tapered surface, a substantially water-tight joint is provided about the shaft.

The stepped form of bearing, comprising the surfaces 41, 43 and 42 of Fig. 2, is also capable of providing a substantially water-tight joint about a shaft of complementary form. The packings of water pumps, particularly those used on automobiles where the water is hot, have been a constant source of trouble, and these packings may be eliminated by employing the present forms of water-tight bearings.

Referring to Fig. 5, this bearing has an arrangement of graphite plugs, and the graphite filled grooves similar to that of Fig. 1. The bearing of Fig. 5, however, is provided with a cylindrical bearing surface 56 and a frusto-conical bearing surface 57. The complementary frusto-conical surface on the shaft used in this bearing is continually forced into the bearing and against the tapered bearing surface 57 by spring pressure or water pressure, and these tapered surfaces form a substantially waterproof seal about the shaft of a water pump.

In the embodiment of Fig. 4, the bearing surface 58 is cylindrical, and it is provided with a plurality of porous graphite plugs 59 which may conduct lubricant to the bearing surface 58, preferably at the intersection of diagonally extending grooves 60, which are filled with porous graphite 61.

The diagonally extending porous graphite members 61 are capable of lubricating either rotating or reciprocating shafts and effecting a good distribution of lubricant in either case.

Referring to Fig. 6, in this embodiment the grooves 62 extend spirally in the same direction on the bearing surface 63 and they are provided with graphite plugs 64 at predetermined points for conducting lubricant from the reservoir 24. The spiral grooves 62 are also filled with porous graphite 65 and grooves 62 are preferably located closer together than the grooves of Fig. 4, to accomplish the same result.

Referring to Fig. 7, this is a bearing shell peculiarly adapted to be used for rotating shafts, and for this purpose, the grooves 66 may extend longitudinally of the shell, being filled with porous graphite 67 which communicates with the graphite plugs 68. Since the grooves extend longitudinally of the bearing, the rotating bearing will wipe lubricant from the graphite filling 67 over substantially the entire bearing surface 69. The lubricant is conducted from the reservoir 24 by the plug 68 and distributed by the longitudinal porous graphite member 67.

The bearing illustrated in Fig. 8 has a multiplicity of circumferentially extending grooves 70 which are filled with porous graphite 71 and which communicate with graphite plugs 72 leading to the reservoir 24. This bearing is peculiarly adapted to effect uniform lubrication of reciprocating shafts, because the peripherally extending graphite members 71 can distribute lubricant to every portion of the reciprocating shaft.

Referring to Fig. 9, this is a bearing in which a cylindrical bearing surface 73 and a thrust bearing surface 74 are provided. The cylindrical bearing surface 73 is provided with diagonally extending grooves 75 in the forms of loops crossing each other, and the grooves are filled with porous graphite 76. Plugs of graphite 77 extending from the reservoir 24 to the intersections of the grooves 75 and auxiliary plug 78 may be provided for communicating with grooves 75 and with plugs 79 which lead to the thrust bearing surface 74.

The modification of Fig. 10 comprises a bearing shell in which it has not been deemed necessary to make provision for positive lubrication of the cylindrical surface 80, but the thrust bearing surfaces 81 and 82 have graphite plugs 83 extending from end to end of the bearing and communicating with the transverse plugs 84, which lead from the reservoir 24.

Referring to Fig. 11, this is an illustration of one mode of applying the present invention to ordinary cup bearings. The shaft 85 is rotatably mounted in the bearing 86, having a cylindrical bearing surface 87. The bore 88 leading to the oil cup 89 may have its lower portion filled with a plug of porous graphite compound 90, and if desired, the plug may extend into the threaded stem 91 of cup 89, and into the chamber of cup 89. The cup 89 may be filled with lubricant of the type described herein if action is desired at a predetermined temperature, or with ordinary lubricant, and lubricant will be continuously dispensed by means of the graphite plug 90.

Referring to Fig. 12, this is an illustration of a tubular fitting 92 comprising a short tube of brass, steel, tin, aluminum, copper or other metal, which is provided with a plug 93 of the same initially plastic porous graphite compound baked in place in the tube 92. Tube 92 may have a pressed fit with any aperture in which it is to be used, or it may be provided with threads 94. The metal tube 92 protects the graphite plug 93 and enables its installation in bearings after the graphite has been hardened and made porous by the baking process.

In the embodiment of Fig. 13, this is a graphite dispensing member 95 of tubular form in which the ends 96 have been spun over to positively retain the graphite plug 97 in place. This modification may be subjected to greater pressure and force without possibility of driving the plug out of the tube.

The lubricant dispensing plugs of Figs. 12 and 13 may be substituted bodily for any of the graphite plug structures described in the preceding figures.

It will thus be observed that I have invented an improved heat responsive self-lubricating bearing in which the lubricant will be retained until a predetermined operating temperature is reached. The solidified lubricant capable of melting at the predetermined temperature, is an operative element in the combination comprising the bearing, when such lubricant is used, and while the lubricant is dispensed by the bearing, it is dispensed so slowly and uniformly that the lubricant may last throughout the life of the bearing. The present bearings are also capable of being manufactured in a multiplicity of different forms, as illustrated, for taking care of various needs and types of lubrication, and certain of these bearings are capable of replacing both the packings and bearings of existing water pumps, and maintaining a substantially water-tight joint about the pump shaft.

While I have illustrated and described a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In a self-lubricating bearing, the combination of a metal bearing shell formed with a cylindrical bore communicating with a tapered counterbore, said tapered counterbore being of larger diameter than said first-mentioned bore and having an annular shoulder at one end adjacent said first-mentioned bore, said cylindrical bore having a plurality of grooves in its surface and having apertures passing through said bearing shell communicating with said grooves, said tapered bore having grooves in its surface with apertures communicating between said last mentioned grooves and the first-mentioned apertures, and porous carbon lubricating compound in said grooves and apertures whereby said bearing surfaces are constantly supplied with lubricant which forms a film on said bearing surface and provides a water-tight seal between said bearing surface and a complementary shaft.

2. In a heat responsive self-lubricating bearing, the combination of a support having a recess for forming a reservoir with a bearing bushing adapted to be inserted in said recess to complete said reservoir, said bushing having a substantially cylindrical bore, an annular shoulder and a tapered counterbore, the surface of said cylindrical bore having a multiplicity of circumferentially and diagonally extending grooves crossing each other, and said bushing having a plurality of transverse apertures leading from the intersections of said grooves at the bearing surface to said reservoir, said tapered counterbore having a plurality of circumferentially and diagonally extending grooves, said latter grooves also crossing each other and communicating with apertures leading from said tapered counterbore to said reservoir at the first mentioned apertures, said grooves and said apertures being filled with initially plastic carbon compound packed to a porous condition and adapted to conduct lubricant from said reservoir to said bearing surfaces, the compound in said grooves distributing said lubricant over the bearing surfaces and providing a uniform film for the purpose of effecting a water-seal with a complementary shaft.

ROBERT H. WHITELEY